(12) United States Patent
Chen et al.

(10) Patent No.: US 11,766,580 B2
(45) Date of Patent: Sep. 26, 2023

(54) VALVE STRUCTURE WITH BUILT-IN VALVE SEAT OF PRE-ACTION WARNING VALVE (71) Applicant: GUANGDONG YONGQUAN VALVE TECHNOLOGY CO., LTD, Foshan (CN)

(72) Inventors: Jiongliang Chen, Foshan (CN); Dawen Huo, Foshan (CN); Jiaxian Ou, Foshan (CN)

(73) Assignee: GUANGDONG YONGQUAN VALVE TECHNOLOGY CO., LTD, Foshan (CN)

( * ) Notice: Subject to any disclaimer, the term of this patent is extended or adjusted under 35 U.S.C. 154(b) by 0 days.

(21) Appl. No.: 17/673,809

(22) Filed: Feb. 17, 2022

(65) Prior Publication Data

US 2022/0170567 A1  Jun. 2, 2022

Related U.S. Application Data

(63) Continuation of application No. PCT/CN2020/127080, filed on Nov. 6, 2020.

(30) Foreign Application Priority Data

Mar. 6, 2020 (CN) .......................... 202010151217.8

(51) Int. Cl.
*A62C 35/68* (2006.01)
*A62C 35/60* (2006.01)
(Continued)

(52) U.S. Cl.
CPC ............ *A62C 35/605* (2013.01); *A62C 35/68* (2013.01); *F16K 1/42* (2013.01); *F16K 37/0066* (2013.01);
(Continued)

(58) Field of Classification Search
CPC ... A62C 35/605; A62C 35/68; F16K 37/0066; F16K 1/42
See application file for complete search history.

(56) References Cited

U.S. PATENT DOCUMENTS 1,141,477 A * 6/1915 Montgomery ....... A62C 35/605
116/277
1,913,027 A * 6/1933 Griffith ................ A62C 35/605
137/493.1
(Continued)

FOREIGN PATENT DOCUMENTS

CN  101548122 A  9/2009
CN  205118281 U  3/2016
(Continued)

OTHER PUBLICATIONS

International Search Report issued in corresponding International application No. PCT/CN2020/127080, dated Jan. 28, 2021.
(Continued)

*Primary Examiner* — Kevin F Murphy (57) ABSTRACT

The present invention discloses a valve structure with a built-in valve seat of a pre-action warning valve, including: a valve body, a valve cap, a valve seat, and a membrane clack. The pre-action warning valve provided in the present invention has the advantages of being simple, reliable, and low in manufacturing costs.

5 Claims, 6 Drawing Sheets

(51) Int. Cl.
    *F16K 39/02*  (2006.01)
    *F16K 1/42*   (2006.01)
    *F16K 37/00*  (2006.01)
(52) U.S. Cl.
    CPC ...... *F16K 39/026* (2013.01); *F16K 2200/402* (2021.08)

(56) References Cited

U.S. PATENT DOCUMENTS

| | | | | |
|---|---|---|---|---|
| 3,220,483 | A * | 11/1965 | Hoevenaar | A62C 35/605 137/79 |
| 5,295,503 | A * | 3/1994 | Meyer | A62C 35/58 251/293 |
| 9,803,755 | B2 * | 10/2017 | Weingarten | F16K 7/17 |
| 2019/0383401 | A1 * | 12/2019 | Zlatintsis | A62C 35/68 |

FOREIGN PATENT DOCUMENTS

| | | |
|---|---|---|
| CN | 206054846 U | 3/2017 |
| CN | 111306305 A | 6/2020 |
| CN | 111336255 A | 6/2020 |
| DE | 19516485 A1 | 11/1996 |

OTHER PUBLICATIONS

Written Opinion of the International Searching Authority for No. PCT/CN2020/127080.

* cited by examiner

VALVE STRUCTURE WITH BUILT-IN VALVE SEAT OF PRE-ACTION WARNING VALVE

TECHNICAL FIELD

This application relates to the related field of fire demand valves, and in particular, to a valve structure with a built-in valve seat of a pre-action warning valve.

BACKGROUND

With the progress of fire protection technologies, relevant requirements for fire demand valves are increasingly raised. A valve illustrated in the patent CN201520937247.6 substantially includes a valve body, probes of various functions, a membrane clack, and a spring for pressing the membrane clack onto a water inlet to seal the water inlet. However, in different scenarios, requirements for fire protection valves are all different. For example, in special places such as a library or an archives room, warning needs to be given when a fire is found by equipment. A pre-action apparatus required for warning is relatively complex and high in production costs, and includes a plurality of detectors and a special controller such as a valve. Therefore, a pre-action valve that is simple in structure, reliable in performance, and low in construction costs is needed on the market to meet development requirements.

SUMMARY

To overcome the defect in the related art, a first objective of the present invention is to provide a valve structure with a built-in valve seat of a pre-action warning valve. Early warning water flow through-holes are provided in the valve seat, and also opening and closing of the through-holes are collectively controlled by a membrane clack for controlling water flow, so that in case of fire, the membrane clack is opened, the early warning water flow through-holes are also opened, water flow is guided in, and warning is given. The solution provided in the present invention has the advantages of being simple, reliable, and low in manufacturing costs.

The objective of the present invention may be implemented by using the following technical solution.

A valve structure with a built-in valve seat of a pre-action alarm valve includes: a valve body, a valve cap, a valve seat, and a membrane clack; where an accommodating cavity is provided in the valve body, and the accommodating cavity includes a water inlet, a water outlet, and a water flow through-hole for communicating the water inlet with the water outlet; the valve seat is embedded in the water flow through-hole; and an early warning channel is provided on the valve body;

the membrane clack is disposed in the accommodating cavity and configured to control opening and closing of the water flow through-hole;

a seal ring is disposed at the bottom of the membrane clack, and the seal ring abuts against the valve seat to form sealing to close the water flow through-hole; or the seal ring is separated from the valve seat to open the water flow through-hole;

an upper surface of the valve seat is a sealing surface; early warning water flow through-holes are provided in the valve seat; and one opening of the early warning water flow through-hole is provided on the sealing surface of the valve seat, and the other opening thereof communicates with the early warning channel.

Preferably, a first annular groove is provided on the sealing surface, and the early warning water flow through-holes communicate with the first annular groove.

Preferably, a second annular groove is provided on a side surface of the valve seat, and the second annular groove separately communicates with the early warning water flow through-holes and the early warning channel.

Preferably, a third annular groove is provided on a side surface of the valve seat, and the third annular groove is configured to install a sealing ring.

Preferably, an early warning sleeve is disposed in the early warning channel.

Preferably, a fourth annular groove for installing a sealing ring is provided on a lower surface of an outer edge of the valve seat, so that the side surface of the valve seat and the lower surface of the outer edge of the valve seat abut against the valve body to form sealing, thereby enabling the second annular groove and the valve body to form a sealed channel.

Preferably, the early warning channel communicates with a warning bell.

Preferably, several early warning water flow through-holes are provided; and one end of each early warning water flow through-hole communicates with the first annular groove, and the other end thereof communicates with the second annular groove.

Compared with the prior art, the present invention has the beneficial effects as follows.

An early warning water flow through-hole is provided in the valve seat, and also opening and closing of the through-hole are collectively controlled by a membrane clack for controlling water flow, so that in case of fire, the membrane clack is opened, the early warning water flow through-hole is also opened, water flow is guided in, and pre-action warning is given. The solution provided in the present invention has the advantages of being simple, reliable, and low in manufacturing costs.

In the figures: 1. Membrane clack; 10. Water inlet; 13. Seal ring; 2. Valve body; 20. Water outlet; 22. Early warning channel; 221. Early warning sleeve; 23. Water flow through-hole; 3. Valve cap; 30. Control cavity; 4. Valve seat; 41. Early warning water flow through-hole; 42. First annular groove; 43. Second annular groove; 44. Third annular groove; 45. Fourth annular groove; 46. Sealing ring; and 5. Warning bell.

DESCRIPTION OF EMBODIMENTS

To make the present invention easy to understand, the following will more comprehensively describe the present invention with reference to the relevant accompanying drawings. The exemplary embodiments of the present invention are given in the accompanying drawings. However, the present invention can be acquired in many different ways, but not to be limited to the embodiments as described herein. On the contrary, these embodiments are provided such that the content disclosed by the present invention can be more thoroughly and comprehensively understood.

It should be noted that when one element is, as stated, "fixed to" another element, it can be directly on the another element, or there can be an element in between. When one element is deemed as being "connected to" another element, it can be directly connected to the another element, or there can be an element in between. The terms "vertical", "horizontal", "left", "right" and other similar expressions as used herein are for illustration only.

Unless otherwise defined, all technical and scientific terms as used herein have the same meanings as those usually understood by a person skilled in the art of the present invention. The terms used in the specification of the present invention herein are for description of the particular embodiments only and are not intended to limit the present invention. The term "and/or" as used herein includes any or all combinations of one or more relevant listed items.

Embodiment 1

Figure 1:
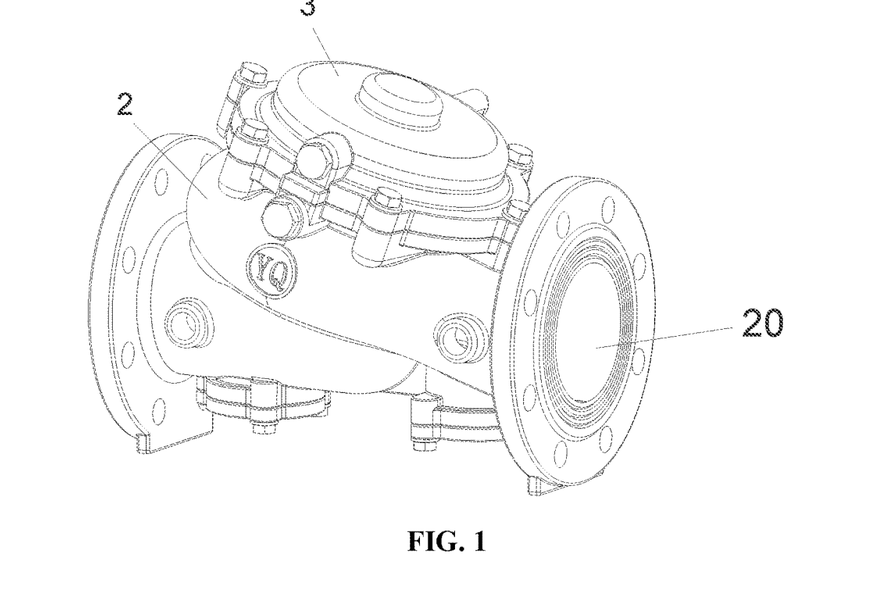
FIG. 1 is a schematic structural diagram of a valve.
Figure 2:
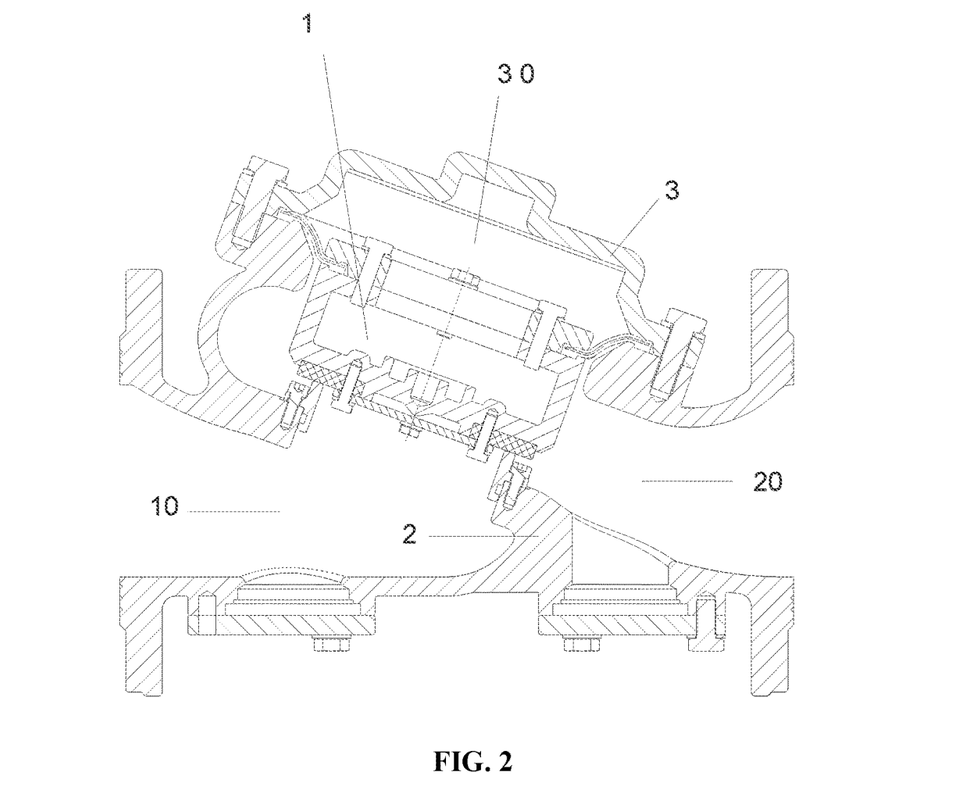
FIG. 2 is a cross-sectional view of a valve in a closed state.
Figure 3:
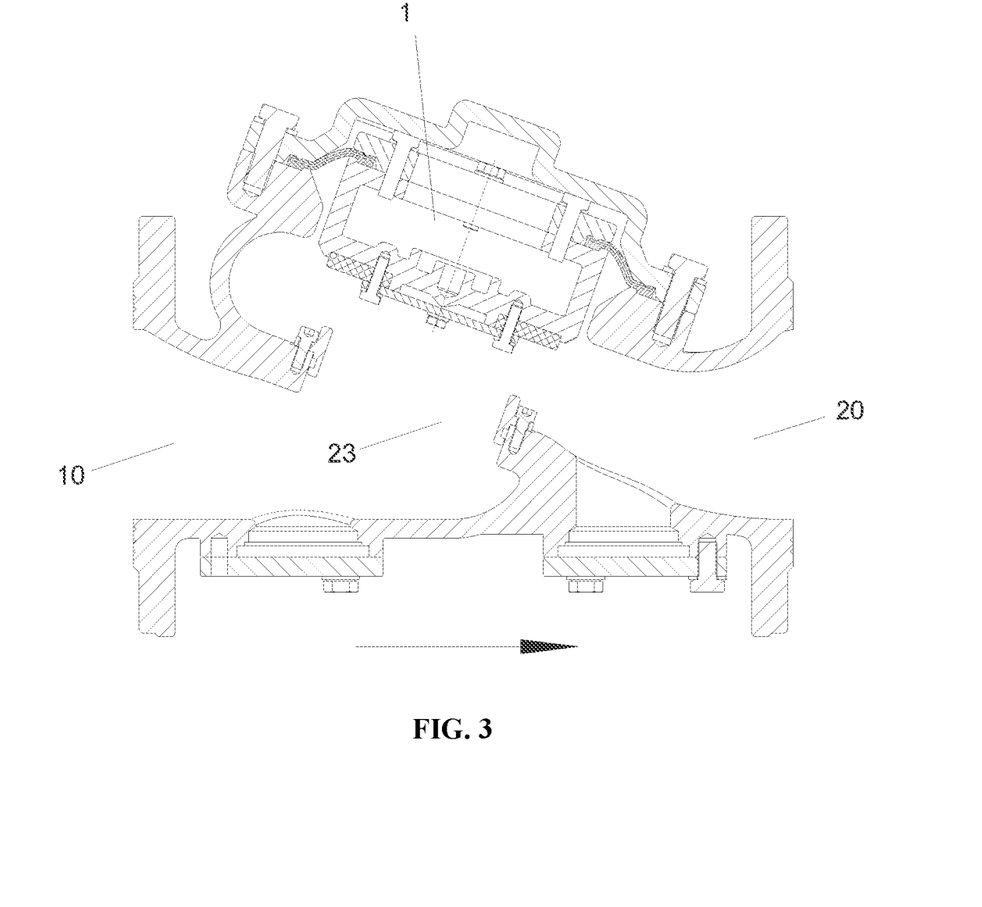
FIG. 3 is a cross-sectional view of a valve in an open state.

As shown in FIG. 1 to FIG. 3, a valve structure includes a valve body 2, a valve cap 3, and a membrane clack 1. The membrane clack 1 is installed in a cavity of the valve body 2, and a membrane of the membrane clack 1 is clamped between the valve cap 3 and the valve body 2, so that a control cavity 30 is formed between the membrane clack 1 and the valve cap 3. For a spring for pushing the membrane clack 1 to move, a belleville spring may be installed on the membrane clack 1, or a spiral spring may be installed between the membrane clack 1 and the valve cap 3, so that a water inlet 10 and a water outlet 20 are separated by the membrane clack 1. A working principle of this embodiment includes: When water is injected into the control cavity 30 and the water inlet 10, under the action of water pressure and also due to pressure of the spring on the membrane clack 1, the membrane clack 1 is closed; when water pressure is less than elastic force of the spring, a closing function may be completed by the spring alone; and when a fire is on, the water outlet 20 relieves pressure, since the control cavity 30 communicates with the water outlet 20, water pressure of the control cavity 30 drops, the water inlet 10 and the water outlet 20 form a pressure difference, and under the action of water pressure, the membrane clack 1 is flushed open, so that water flows through the water flow through-hole 23 to the water outlet 20 from the water inlet 10 to implement water passing.

Embodiment 2

As shown in FIG. 1 to FIG. 8, a valve structure with a built-in valve seat of a pre-action alarm valve includes: a valve body 2, a valve cap 3, a valve seat 4, and a membrane clack 1; where an accommodating cavity is provided in the valve body 2, and the accommodating cavity includes a water inlet 10, a water outlet 20, and a water flow through-hole 23 for communicating the water inlet 10 with the water outlet 20; the valve seat 4 is embedded in the water flow through-hole 23; and an early warning channel 22 is provided on the valve body 2;

the membrane clack 1 is disposed in the accommodating cavity and configured to control opening and closing of the water flow through-hole 23;

a seal ring 13 is disposed at the bottom of the membrane clack 1, and the seal ring 13 abuts against the valve seat 4 to form sealing to close the water flow through-hole 23; or the seal ring 13 is separated from the valve seat 4 to open the water flow through-hole 23; and an upper surface of the valve seat 4 is a sealing surface, namely an abutting surface against the seal ring 13; early warning water flow through-holes 41 are provided in the valve seat 4; and one opening of the early warning water flow through-hole 41 is provided on the sealing surface of the valve seat 4, and the other opening thereof communicates with the early warning channel 22. In this embodiment, the valve and the valve in Embodiment 1 have a same operating mechanism, specifically except that in the case of opening the membrane clack 1, the openings of the early warning water flow through-holes 41 are provided on the sealing surface, so that the early warning water flow through-holes 41 can be opened when the membrane clack 1 is opened, and in this case, the early warning channel that communicates with the early warning water flow through-holes 41 may acquire water flow or water pressure to arouse warning, so as to implement a pre-action warning function.

Figure 4:
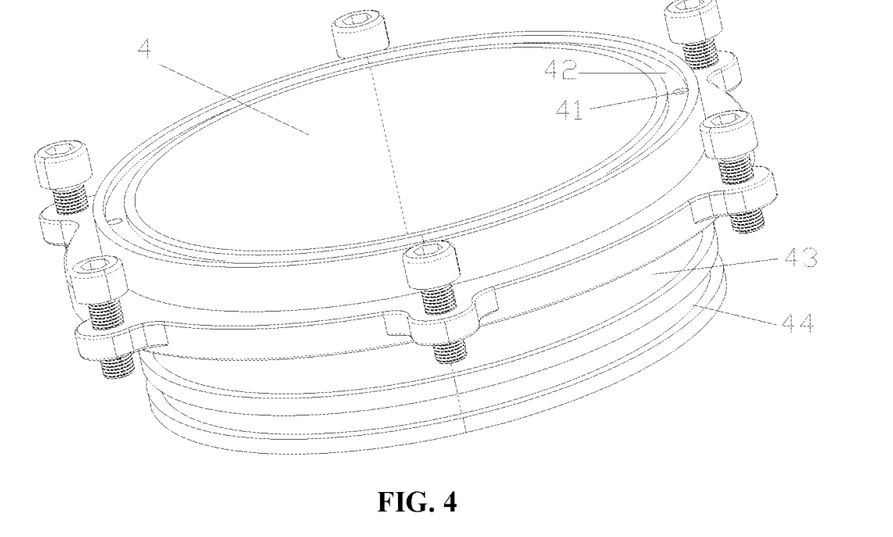
FIG. 4 is a schematic structural diagram of a valve seat.
Figure 5:
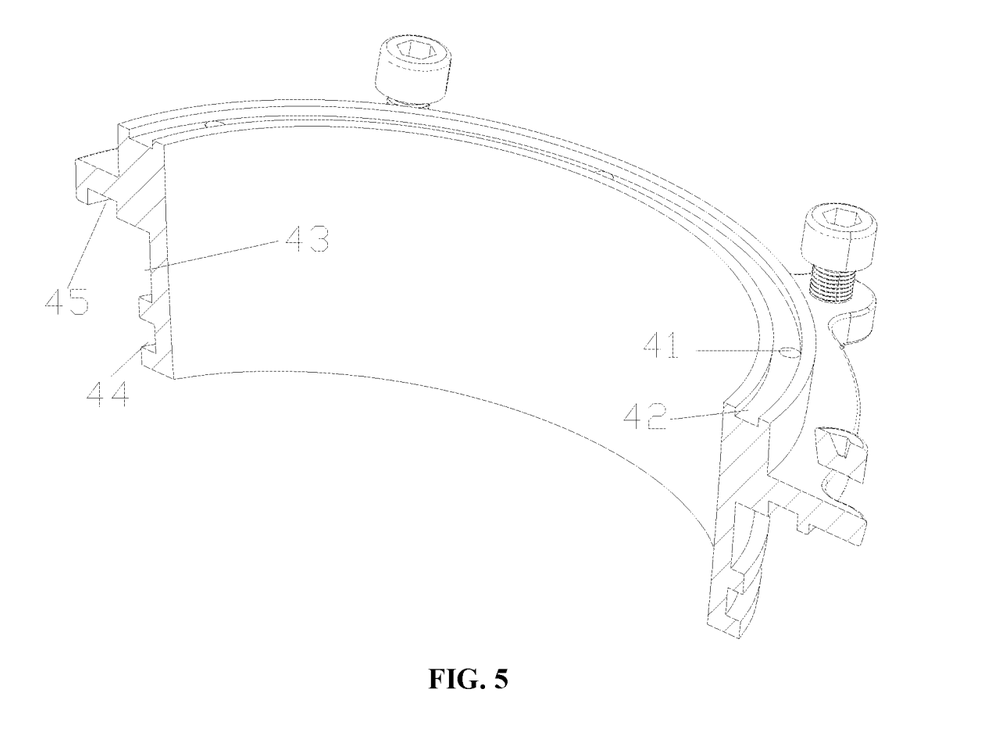
FIG. 5 is a cross-sectional view of a valve seat.
Figure 6:
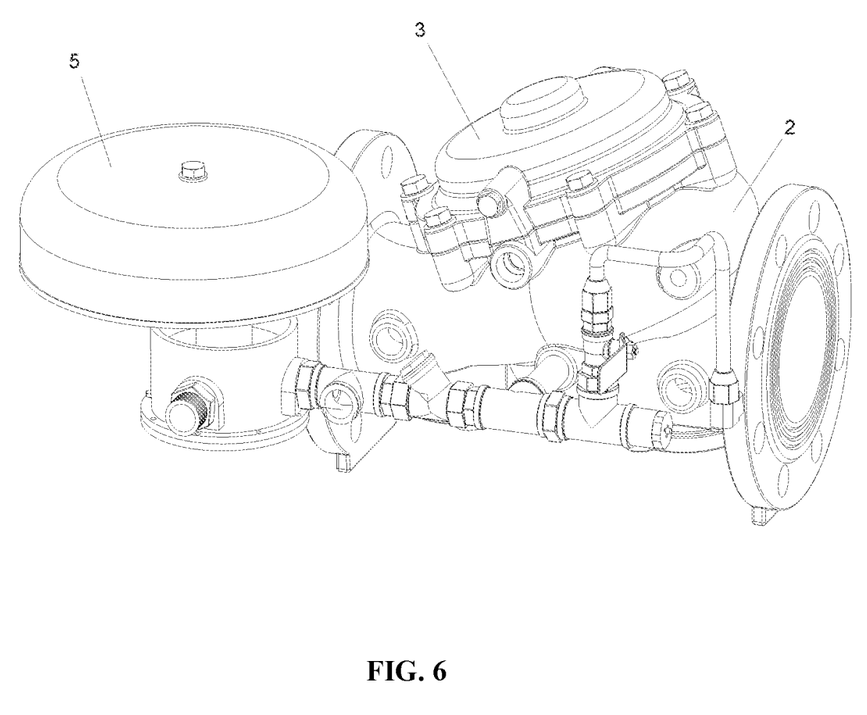
FIG. 6 is a schematic structural diagram of a valve.
Figure 7:
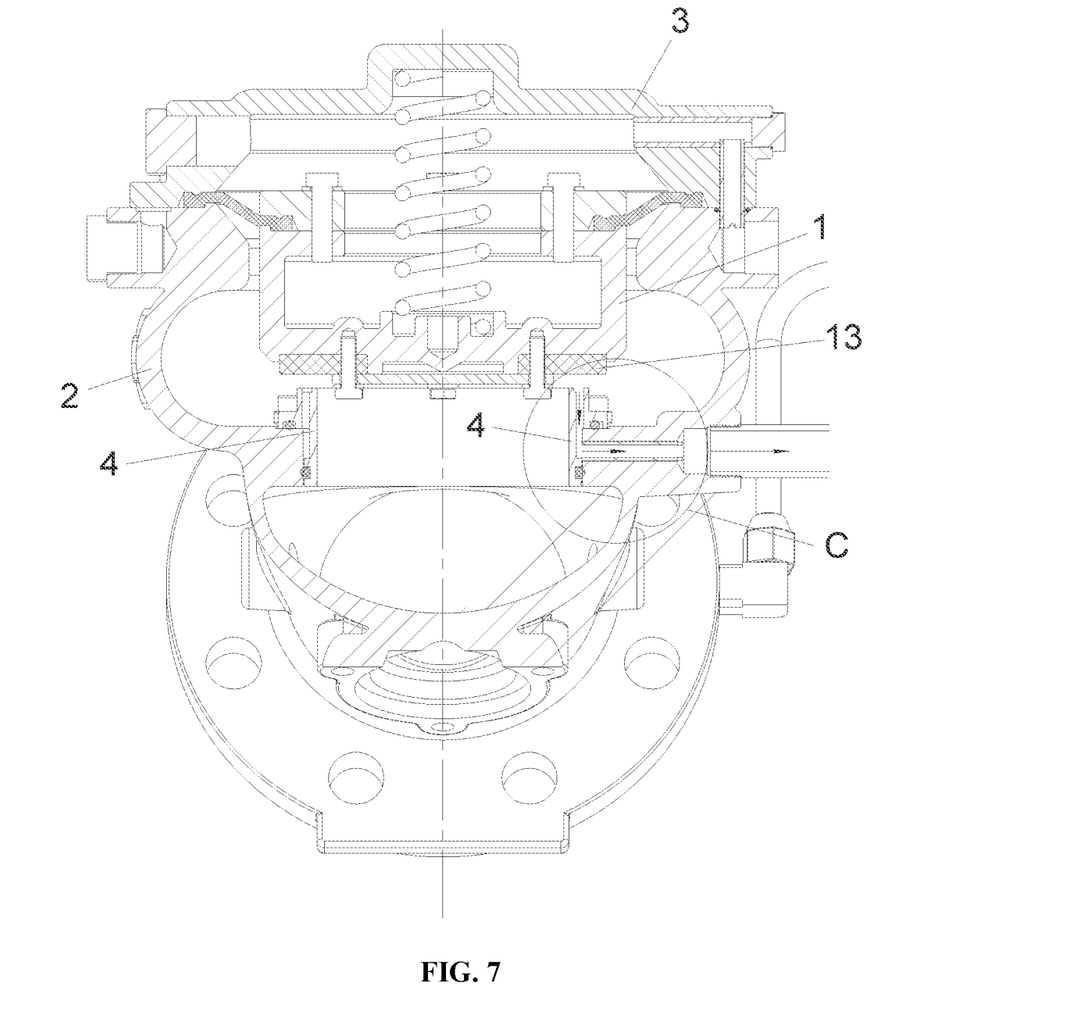
FIG. 7 is a cross-sectional view of a valve.
Figure 8:
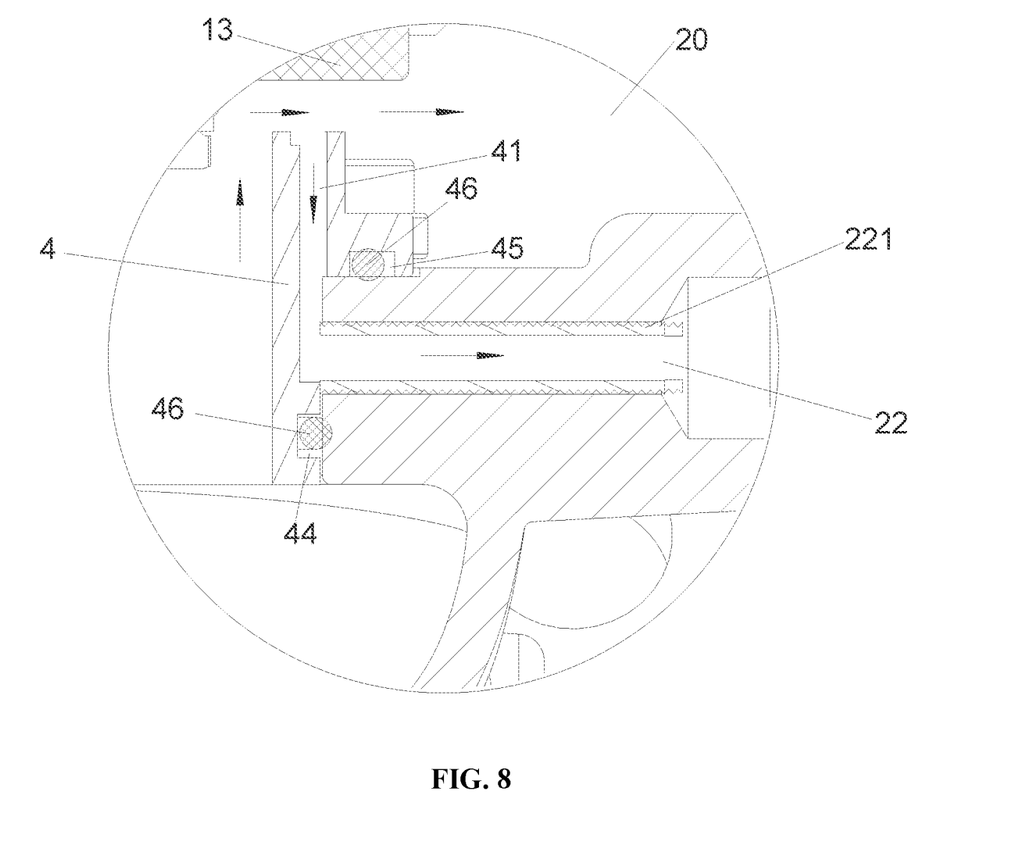
FIG. 8 is an enlarged view of an area C in FIG. 7.

In an implementation, a first annular groove 42 is provided on the sealing surface, and the early warning water flow through-holes 41 communicate with the first annular groove 42. A second annular groove 43 is provided on a side surface of the valve seat 4, and the second annular groove 43 separately communicates with the early warning water flow through-holes 41 and the early warning channel 22. Several early warning water flow through-holes 41 are provided; and one end of each early warning water flow through-hole 41 communicates with the first annular groove 42, and the other end thereof communicates with the second annular groove 43. With arrangement of the first annular groove 42 and the multiple early warning water flow through-holes 41, sealing is easier. With arrangement of the second annular groove 43 that is configured to collect water flow flowing into each early warning water flow through-hole 41, volume and water pressure of the water flow are ensured. Also, with arrangement of the second annular groove 43, the early warning water flow through-holes 41 in the valve seat 4 more conveniently communicate with the early warning channel 22, specific aligned installation is not needed, and installation difficulty is reduced.

In an implementation, a third annular groove 44 is provided on a side surface of the valve seat 4, and the third annular groove 44 is configured to install a sealing ring 46. An early warning sleeve 221 is disposed in the early warning channel 22. When the sleeve 221 made of non-rust material such as stainless steel is used, it can be avoided that an interior of a hole gets rusted due to difficulty in rust prevention, or gets blocked by rust. A fourth annular groove 45 for installing a sealing ring 46 is provided on a lower surface of an outer edge of the valve seat 4, so that the side surface of the valve seat 4 and the lower surface of the outer edge of the valve seat 4 abut against the valve body 2 to form sealing, thereby enabling the second annular groove 43 and the valve body 2 to form a sealed channel. The early warning channel communicates with a warning bell 5 so as to give rapid warning, or may communicate with another warning apparatus such as a water flow detector so as to give warning.

Skilled persons in the art can make various other corresponding changes and modifications according to the technical solutions and concept described above, and all such changes and modifications should fall within the protection scope of the claims of the present invention.

What is claimed is:

1. A valve structure with a built-in valve seat of a pre-action warning valve, comprising: a valve body, a valve cap, a valve seat, and a membrane clack; wherein an accommodating cavity is provided in the valve body, and the accommodating cavity includes a water inlet, a water outlet, and a water flow through-hole for communicating the water inlet with the water outlet; the valve seat is embedded in the water flow through-hole; and an early warning channel is provided on the valve body;

the membrane clack is disposed in the accommodating cavity and configured to control opening and closing of the water flow through-hole;

a seal ring is disposed at the bottom of the membrane clack, and the seal ring abuts against the valve seat to form sealing to close the water flow through-hole; or the seal ring is separated from the valve seat to open the water flow through-hole;

an upper surface of the valve seat is a sealing surface; early warning water flow through-holes are provided in the valve seat; and one opening of the early warning water flow through hole through-holes is provided on the sealing surface of the valve seat, and the other opening thereof communicates with the early warning channel;

wherein a first annular groove is provided on the sealing surface, and the early warning water flow through-holes communicate with the first annular groove;

wherein a second annular groove is provided on a side surface of the valve seat, and the second annular groove separately communicates with the early warning water flow through-holes and the early warning channel;

wherein a fourth annular groove located above the second annular groove for installing a sealing ring is provided on a lower surface of an outer edge of the valve seat, so that the side surface of the valve seat and the lower surface of the outer edge of the valve seat abut against the valve body to form sealing, thereby enabling the second annular groove and the valve body to form a sealed channel.

2. The valve structure with a built-in valve seat of a pre-action warning valve according to claim 1, wherein a third annular groove is provided on a side surface of the valve seat, and the third annular groove is configured to install a sealing ring.

3. The valve structure with a built-in valve seat of a pre-action warning valve according to claim 1, wherein an early warning sleeve is disposed in the early warning channel.

4. The valve structure with a built-in valve seat of a pre-action warning valve according to claim 1, wherein the early warning channel communicates with a warning bell.

5. The valve structure with a built-in valve seat of a pre-action warning valve according to claim 1, wherein a plurality of early warning water flow through-holes are provided; and one end of each early warning water flow through-hole communicates with the first annular groove, and the other end thereof communicates with the second annular groove.

* * * * *